US012591212B2

(12) United States Patent
Redvers et al.

(10) Patent No.: US 12,591,212 B2
(45) Date of Patent: Mar. 31, 2026

(54) DYNAMIC UI GENERATION FOR CLOUD BUILDING MANAGEMENT SYSTEMS USING ASSET MODELS

(71) Applicant: Honeywell International Inc., Charlotte, NC (US)

(72) Inventors: Simon Redvers, London (GB); Shailesh Rasane, Charlotte, NC (US); Michael Rowlinson, Charlotte, NC (US); Jim Mathioudakis, Charlotte, NC (US); Scott Kemp, Charlotte, NC (US); Andrew Firmage, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 525 days.

(21) Appl. No.: 18/075,185

(22) Filed: Dec. 5, 2022

(65) Prior Publication Data

US 2023/0176537 A1    Jun. 8, 2023

Related U.S. Application Data

(60) Provisional application No. 63/285,978, filed on Dec. 3, 2021.

(51) Int. Cl.
*G05B 19/042* (2006.01)
*G06F 16/332* (2019.01)

(52) U.S. Cl.
CPC ...... *G05B 19/0428* (2013.01); *G06F 16/3328* (2019.01)

(58) Field of Classification Search
CPC ........................ G05B 19/0428; G06F 16/3328
See application file for complete search history.

(56) References Cited

U.S. PATENT DOCUMENTS

| | | | |
|---|---|---|---|
| 2018/0278434 A1* | 9/2018 | Maseng | H04L 12/2814 |
| 2023/0070842 A1* | 3/2023 | Wei | G06F 40/30 |
| 2023/0153477 A1* | 5/2023 | Somu | G06F 30/12 |
| | | | 703/1 |

* cited by examiner

*Primary Examiner* — Michael W Choi
(74) *Attorney, Agent, or Firm* — ALSTON & BIRD LLP

(57) ABSTRACT

Provided herein are system, method and computer program product embodiments, and/or combinations and sub-combinations thereof, for dynamically generating user interfaces (UI) for displaying live and historical asset data using asset modeling to relate each data point to an asset where it has a specific 'role' and each role has a defined function for the type of asset. For a number of display types, including 'live values', 'historical trends' and 'related assets', the user interface (UI) display is dynamically generated and structured for the asset type based on the asset model. As new asset types are added to the model or new relationships defined, no additional design or engineering work is required to update the UI.

19 Claims, 6 Drawing Sheets

300

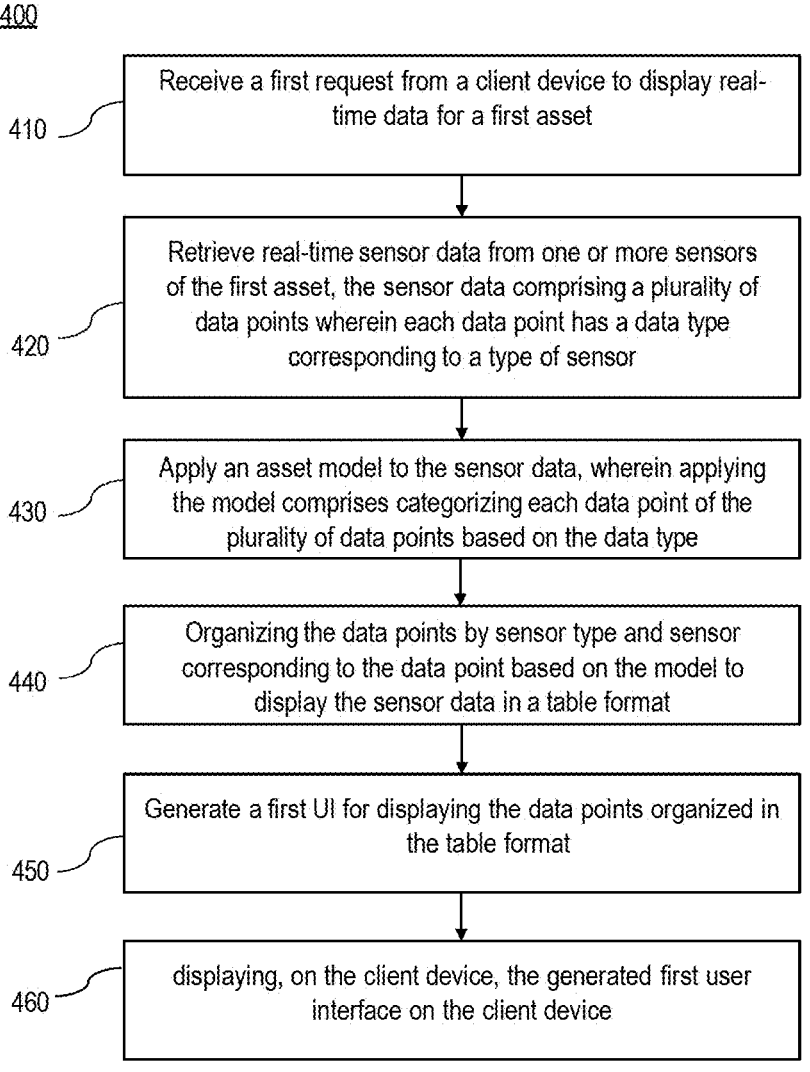

400

410 — Receive a first request from a client device to display real-time data for a first asset 420 — Retrieve real-time sensor data from one or more sensors of the first asset, the sensor data comprising a plurality of data points wherein each data point has a data type corresponding to a type of sensor 430 — Apply an asset model to the sensor data, wherein applying the model comprises categorizing each data point of the plurality of data points based on the data type 440 — Organizing the data points by sensor type and sensor corresponding to the data point based on the model to display the sensor data in a table format 450 — Generate a first UI for displaying the data points organized in the table format 460 — displaying, on the client device, the generated first user interface on the client device

FIG. 4

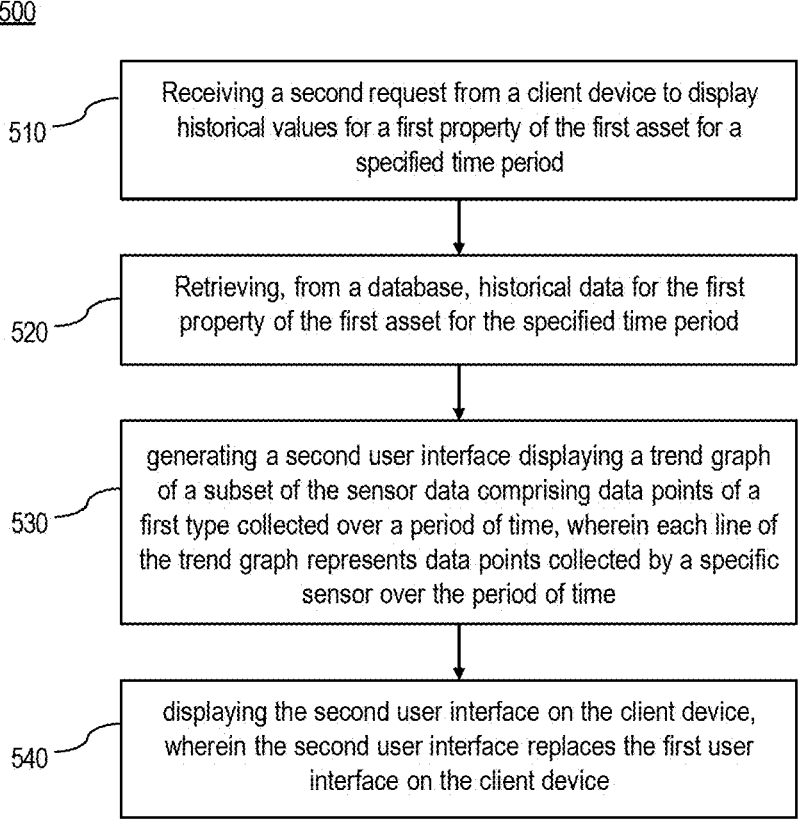

500

510 — Receiving a second request from a client device to display historical values for a first property of the first asset for a specified time period 520 — Retrieving, from a database, historical data for the first property of the first asset for the specified time period 530 — generating a second user interface displaying a trend graph of a subset of the sensor data comprising data points of a first type collected over a period of time, wherein each line of the trend graph represents data points collected by a specific sensor over the period of time 540 — displaying the second user interface on the client device, wherein the second user interface replaces the first user interface on the client device

FIG. 5

Computer System 600

Processor 604

Main Memory 608

User Input/Output Interface(s) 602

User Input/Output Device(s) 603

Communication Infrastructure 606

Secondary Memory 610

Hard Disk Drive 612

Removable Storage Drive 614

Interface 620

Removable Storage Unit 618

Removable Storage Unit 622

Communications Interface 624

Remote device(s), network(s), entity(ies) 628

Communications Path 626

DYNAMIC UI GENERATION FOR CLOUD BUILDING MANAGEMENT SYSTEMS USING ASSET MODELS

CROSS-REFERENCE TO RELATED APPLICATIONS

This application claims the benefit of U.S. Provisional Patent Application No. 63/285,978, filed Dec. 3, 2021, entitled "Dynamic UI Generation for Cloud Building Management Systems Using Asset Models," which is incorporated by reference herein in its entirety.

BACKGROUND

Managing and monitoring the operations of assets at manufacturing plants, storage warehouses, and other commercial buildings is an important aspect of ensuring optimal performance of machinery and maintain production output. A commercial building may have many assets that require such monitoring including, heaters, fans, air compression units, pumps, etc. Each of these assets may have multiple functions that need to be monitored in order to catch and rectify any issues before safety or production output is impacted. In order to quickly troubleshoot and resolve an issue with related to an asset, the facilities manager needs to understand the current and historical trend values of properties on the asset (values and set-points for temperatures, pressures, flows, etc.), and systems of assets particularly upstream and downstream relationships.

BRIEF DESCRIPTION OF THE DRAWINGS

The accompanying drawings are incorporated herein and form a part of the specification.

FIG. 4 is a flowchart illustrating a process for generating UI to display sensor data from assets, according to some embodiments.

FIG. 5 is a flowchart illustrating a process for using asset modeling to generate UI for displaying historical trend data for a property of an asset, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
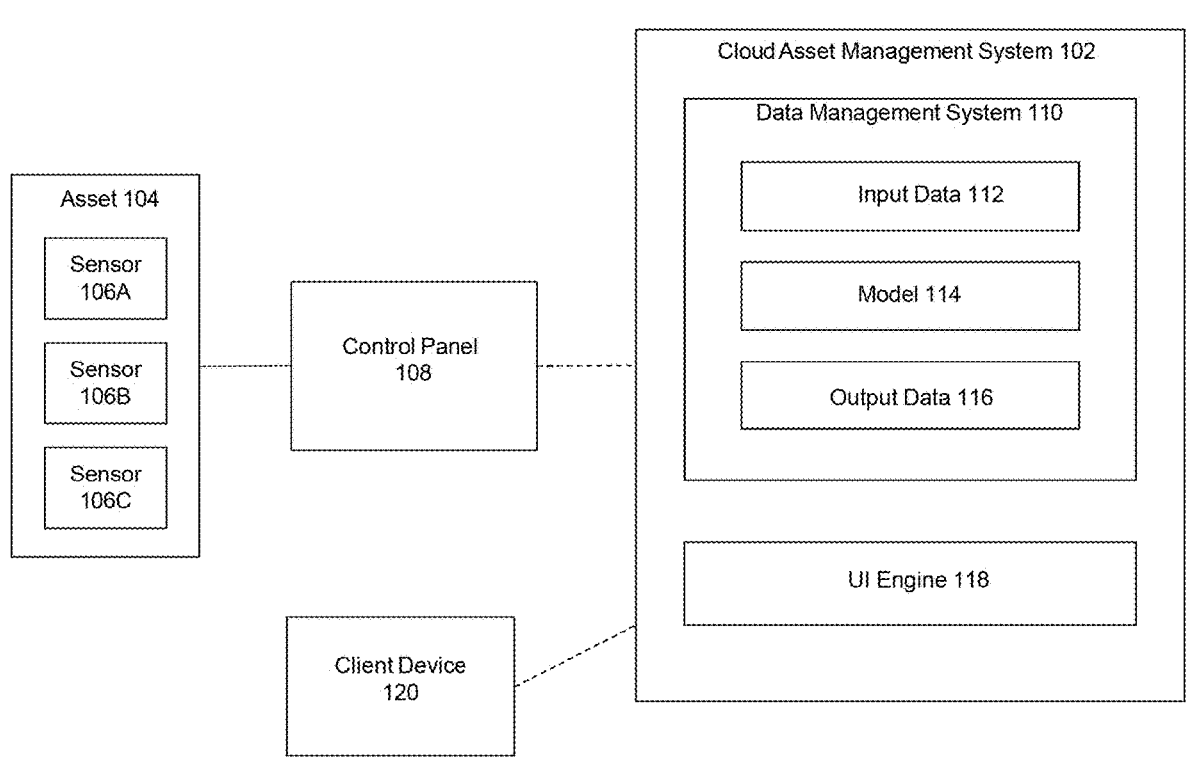
FIG. 1 illustrates a block diagram of a building management system that uses asset models to dynamically generate user interfaces (UI) for displaying asset data, according to some example embodiments.

Provided herein are system, method and/or computer program product embodiments, and/or combinations and sub-combinations thereof, for dynamically generating user interfaces (UI) for displaying live and historical asset data using asset modeling to relate each data point to an asset where it has a specific 'role' and each role has a defined function for the type of asset. For a number of data types, including 'live values', 'historical trends' and 'related assets', the user interface (UI) display is dynamically generated and structured for the asset type based on the asset model. As new asset types are added to the model or new relationships defined, no additional design or engineering work is required to update the UI.

Maintaining optimal environmental conditions in commercial facilities such as warehouses, manufacturing facilities, office buildings, etc. requires the use of multiple building assets. Examples of these assets may include heaters, cooling units, air compression units, air pumps, humidifiers, etc. A facilities/building manager may manage the operational and/or functional settings of such assets using asset management systems. An asset management system may be a cloud based system and may connect to the variety of assets in use in a facility via a control panel located within the facility. The control panel may be configured to allow a user to adjust the operational and/or functional settings of the various assets in the facility. The control panel may further be configured receive data regarding the state of each asset and transmit the data to the cloud based asset management system. This data may include values collected by sensors associated with assets in the facility as well as the state of specific components of an asset.

In some embodiments, the control panel may continuously transmit live data from the assets in use at the facility to the cloud-based asset management system. The asset management system may include a data management system (DMS) that may receive the data, process, and store the asset data. The data management system may store the asset data in a database that may be queried to retrieve historical values for properties associated with the facility assets.

The asset management system may include a client application including a dashboard on which asset data may be displayed. The client application may be accessed using a client computing device such as a desktop PC, tablet, laptop, smart phone, etc. A user (e.g., facilities manager, engineer, etc.) may use this application to check the real-time status of the facility's assets. Additionally, the user may use the application to troubleshoot any issues/failures of an asset.

For example, the user may receive an alert that the temperature in a certain part of the facility is above the acceptable range for the area. In order to troubleshoot this issue, the user may use the application to view live data for the cooling unit responsible to cooling the area of the facility where the issue has been detected. Reviewing the live data for the cooling unit may allow the user to determine which aspects of the cooling units may be causing the problem. Once identifying which properties of the cooling unit have values outside of the acceptable range, the user may investigate the issue further by reviewing the values for assets upstream from cooling unit to determine where the issue originated. Additionally or alternatively, the user may review historical data for the cooling unit and/or the upstream asset the user has identified as the source of the failure.

Performing this level of troubleshooting in conventional asset management systems can often be very time consuming. This is because conventional asset management systems do not provide flexible data visualization. A conventional asset management system may provide an application with a dashboard that allows the user to view live data for an asset. However, the user may be limited to a view that includes values for all the properties associated with the asset causing the user to have to scour the dashboard to find the properties relevant to the issue at hand. Additionally, conventional systems do not provide a way to view relationships between different assets. This means a user may have to consult other sources or already know which assets are upstream or downstream of any given asset in order to identify the origin of a particular failure.

Asset management systems are often customized to fit the need of each facility. As such, conventional systems are rigidly designed to fit the specific assets in use at the particular facility. This is particularly true of the user interfaces provided in the client application for conventional systems. Because the systems are customized for the assets in a facility, the dashboards for viewing data associated with those assets are also custom built. While the client may specify the types of dashboards they would like to have, these specifications are communicated during the customization process and do not account for needs that may arise during operation. Additionally, in conventional asset management systems, the user interface for these dashboards are manually designed and thus resource intensive to create. Accordingly, even if a client is able to anticipate their ahead of time, implementing multiple user interfaces will likely be very expensive.

For example, a user may want to view temperature data associated with all the cooling units in the facility. In a conventional asset management system, a user interface for specifically viewing the temperature data for all the cooling units in the facility must have been predesigned and implemented in the software in order for the user to view this specific data. Furthermore, even if such a user interface had been designed and implemented, the addition or removal of a cooling unit in the facility would, at best, render the data being displayed inaccurate. At worst, this kind of change would break that user interface rendering it useless. As such, any changes to assets managed by a conventional asset management system will require additional UI design to incorporate the changes. As mentioned above, this is likely to be resource intensive and expensive.

The system and method provide in the present disclosure provides an efficient solution for this problem by using asset models to dynamically generate user interfaces for displaying asset data. An asset model for a particular instance of an asset management system may describe they system as a function of all the assets managed by the system, the properties associated with each asset, the upstream/downstream relationships between the assets, and the relationships between the properties associated with the assets. User interfaces for any combination of these assets and/or properties associated with the assets may be dynamically generated using the asset model for system. Thus, dynamically generating UI for displaying asset data allows the user to select the specific types of data related to one or more assets to display.

In some embodiments, a user interface engine may use the asset model to determine all the properties associated with a specific asset and the relationships between them in order to display data for the asset. For example, a user may select an asset for which they wish to view live data. Accordingly, the user interface engine may generate a user interface with a table including all the properties and corresponding values for the asset organized by default categories from the asset model. The user may then decide that they would like to only view assets from a particular category in order to focus on the specific data they need. The user interface engine may accordingly use the asset model to identify the properties that belong to the selected category. This is particularly useful for properties that may belong to multiple categories.

FIG. 1 illustrates a block diagram of building management system 100 that uses asset modeling to dynamically generate UI for displaying live and historical data for multiple building assets 104, according to some embodiments. Building management system 100 may be used to manage assets 104 in use across one or more facilities. Building management system 100 may comprise a Cloud Asset Management System (CAMS) 102, building assets 104, control panel 108, and client devices 120. Cloud asset management system (CAMS) 102 may include Data Management System (DMS) 110 for storing and analyzing both live and historical data for the assets 104 managed by building management system 100. CAMS 102 may also include UI engine 118 for dynamically generating a UI for displaying live and historical data for assets 104.

Building management system 100 may include a plurality of assets 104 across one or more facilities. Assets 104 may include any machinery or equipment used in a commercial or industrial facility or organization. Examples of assets 104 may include, but are not limited to, heaters, air compression units, air pumps, filters, air conditioners, cooling units, dehumidifiers, etc. At any given time, the state and functionality of each asset 104 may be described by a plurality of properties. These properties may include binary state properties or properties having a range of possible values.

As a non-limiting example, asset 104 may be a dehumidifier unit. Accordingly, the state and functionality of asset 104 may be described by the values of properties related to specific components within the asset. For example, the state of asset 104 may be described by binary state properties such as the statuses of one or more fans that are a part of asset 104. These binary state properties may each have a value of "on" or "off" indicating whether the one or more fans are powered on at a given point in time. Additionally, asset 104 may have properties that have a range of possible values such as the humidity or temperature at specific points inside the area of operation of asset 104.

In some embodiments, asset 104 may include one or more sensors 106 used to track various mechanical, functional, and/or operational metrics regarding the asset 104. For example, FIG. 1 depicts asset 104 having sensors 106A, 106B, and 106C (referred to generally as sensor 106 or sensors 106). Examples of sensors 106 may include, but are not limited to thermometers, humidity sensors, pressure sensors, flow switches, vibration sensors, etc.

In some embodiments, sensors 106 may take periodic or continuous readings and transmit the readings to control panel 108. Control panel 108 may be used to monitor data collected by sensors 106 across assets 104. Control panel 108 may be communicatively coupled to assets 104 such that it can receive and/or retrieve data collected by sensors 106, either in real-time or periodically.

In some embodiments, control panel 108 may be located inside the facility where assets 104 operate. In such embodiments, control panel 108 may be located at a central location within the facility (e.g., control room). Alternatively, control panel 108 may be located near the location of one or more of assets 104. In some embodiments, control panel 108 may be configured to enable a user, such as a facilities manager, to adjust the operational and/or functional settings of one or more of assets 104. For example, a facilities manager may use control panel 108 to manually disable a single component of asset 104 such as a fan operating at a specific location within the operation area of asset 104.

In some embodiments, control panel 108 may be configured to communicate with Cloud Asset Management System (CAMS) 102 and transmit the data collected by sensors 106 as well as other state information regarding the state of assets 104. Communication between control panel 108 and CAMS 102 may be continuous in order to allow CAMS 102 to receive real-time data for assets 104.

As noted above, CAMS 102 may include Data Management System (DMS) 110 and a UI generator or engine 118. DMS 110 may include asset model 114 describing the plurality of assets 104 in building management system 100 as well as the ways in which the different assets may relate to each other. Asset model 114 may also describe each asset of the plurality of assets 104 as a function of the state, operational and functionality properties of the asset for which data points may be collected, monitored, and/or stored by building management system 100.

In some embodiments, DMS 110 may receive raw operational and functionality data from control panel 108 as input data 112. DMS 110 may then apply model 114 to input data 112 to generate output data 116. For example, asset model 114 may describe assets 104 managed by building management system 100. One asset of assets 104 may be an air conditioner 104. Air conditioner 104 may collect (u and share such as temperatures, pressure, as well as the status of fans, pumps, etc. Asset model 114 may describe air conditioner 104 as a function of the state, operational and functionality properties of air conditioner 104.

In some embodiments, asset model 114 may include properties for air conditioner 104, such as temperatures, pressure, as well as the status of fans, pumps, etc. and the relationships between these properties. Accordingly, asset model 114 may include the relationships between the various properties of air conditioner 104 and the properties of a cooling unit (which may include or may operate in conjunction with air conditioner 104).

For example, model 114 may describe the relationship between flow rate data captured by sensor 106A and pressure data captured by 106B. By applying model 114 to input data 112 comprising raw sensor data from sensors 106A and 106B, DMS 110 may determine which data points correspond to each sensor of sensors 106 and the relationship between the flow rate and pressure values in air conditioner 104 (i.e., how a change in flow rate values captured by 106A may affect pressure values captured by 106B and vice versa).

In some embodiments, input data 112 may contain data points from several assets or control panels operating across the one or more facilities. As such, model 114 may also describe the relationships between the many assets operating across the one or more facilities and being managed across different control panels 108. Accordingly, asset model 114 may include information about how the cooling unit 104 relates to other assets in system 100. For example, air conditioner 104 may be downstream from a liquid cooling unit and thus changes in the operation of the liquid cooling unit may impact the operation/functionality of air conditioner 104.

In some embodiments, output data 116 may include some or all data points from input data 112 based on the intended use of output data 116. For example, output data 116 may be generated by DMS 110 in response to a request from UI engine 118 for flow rate data captured by sensor 106 of air conditioner 104 over the last 24 hours. DMS 110 may then apply asset model 114 to input data 112 to determine which data points correspond to sensor 106 of asset 104. In some embodiments, applying model 114 to input data 112 may include categorizing the data points in input data 112 based on the time when the data was collected as well as the data type. Additionally, the data points in output data 116 may be identified and/or organized, based on model 114, in such a way that visual representations of the data points can be generated based on the asset to which the data point relates and the specific functionality/property it represents for the asset. In some embodiments, output data 116 may be sent to UI engine 118 in response to a data request. In some embodiments, UI engine 118 may use output data 116 to dynamically generate visual representations (tables, graphs, etc.) of output data 116 to be displayed on client device 120.

In some embodiments, UI engine 118 may receive a request from client device 120 to generate a UI for displaying data related to one or more assets 104. The request from client device 120 may comprise one or more assets 104 for which to display output data 116, the properties to display for the one or more assets 104, and a time period. The time period may indicate whether to display live data or historical data for the selected asset. If historical data is requested, the request may also include a time range for which to display data for the one or more assets 104.

In some embodiments, UI engine 118 may use the relationships between the one or more assets 104 and the properties for the assets to generate visual representation of the requested data. For example, if asset 104 is a heating system with sensors 106A, 106B, and 106C representing multiple temperature, humidity, and air quality sensors respectively located in various locations across the facility, UI engine 118 may generate a live value table organized in such a way that all temperature readings are displayed one row. Similarly, data points from humidity sensors associated with heating system asset 104, may be also be grouped together allowing the user easily find the type of data they are interested in.

Using the live data table generated by UI generator 118, a facilities manager is able to observe real-time operational data related to asset 104. In the event that an issue occurs in asset 104, the facilities manager may use the table generated above to easily determine which functionalities of asset 104 have been affected based which sensor data values in the table fall outside the acceptable range. In the example where asset 104 is a heating system, an issue may occur that causes the temperature in a particular part of the facility to drop. As a result, the facilities manager may use client device 120 to view a real-time data table generated by UI generator 118 for asset 104. The facilities manager may navigate to the temperature section of the table to see that not all temperature values are not affected but that the affected values that fall below the allowable range are from temperature sensors in a specific area of the facility. With this information, the facilities manager may be able to quickly rule out the heating functionality of the system as the issue. The manager may instead navigate to the section of the table displaying data related to fan functionality and determine if a fan associated with asset 104 has malfunctioned.

Upon determining the issue, the facilities manager may want to better understand when the issue started and the trend of the temperature in that area of the facility to determine if further action may need to be taken. In order to do this, the facilities manager may navigate to trend graph generated by UI generator 118 displaying the trend in temperature data for each temperature sensor associated with asset 104 over a period of time.

Figure 2:
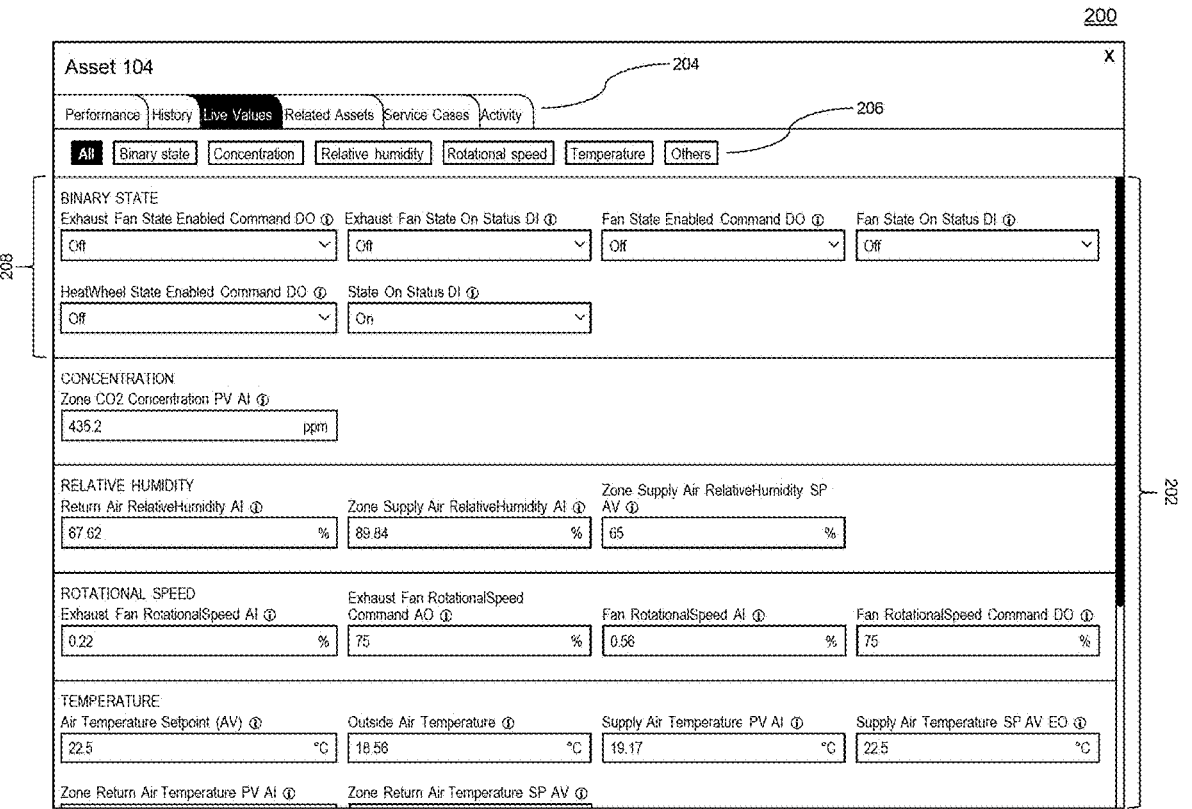
FIG. 2 illustrates an example dashboard displaying categorized live sensor data associated with a particular asset.

FIG. 2 illustrates an example dashboard displaying live data for asset 104. As shown in FIG. 2, dashboard 200 includes live data table 202, context tabs 204, and property types 206. A user may select a tab of context tabs 204 to view different contextual data for selected asset 104. For example, as shown in FIG. 2, the user may view live data, historical data, and performance related data for asset 104. Additionally, the user may select the "Related Assets" tab to view other assets related to the functionality of asset 104 as well as how they relate to asset 104—as may have been extracted or determined from model 114. In some embodiments, the user may select a related asset within the "Related Assets" tab to view live, historical or performance data for the related asset. In some embodiments, dashboard 200 may include a "Service cases" tab. The service cases tab may allow the user to review any outstanding service cases for asset 104. The "Activity" tab may display service or maintenance activities that have been recorded or performed with regard to the displayed asset.

Figure 3:
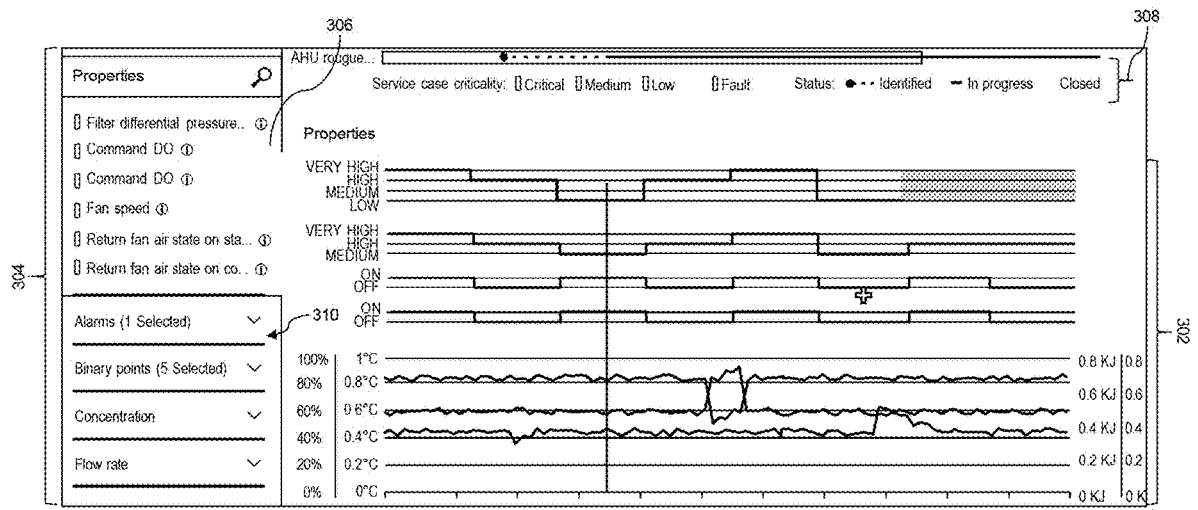
FIG. 3 illustrates an example graph depicting trends of data collected by sensors associated with a particular asset.

FIG. 3 illustrates an example dashboard 300 displaying historical trend graphs for selected properties of asset 104. Dashboard 300 may comprise trend graphs 302, properties selection panel 304, and status indicator legend 308. In some embodiments, UI engine 118 may generate UI for displaying trend graphs 302 for one or more properties 306 over a period of time. Properties 306 may be selected using property selection panel 304. A user may use the search bar to search specific properties the user would like to include in trend graphs 302. Alternatively, the user may select properties by selecting one of the property groups in property selection panel 304 to find the desired property. Additionally, the user may use status indicator legend 308 to determine the severity of any outstanding service cases related to the selected properties 306.

FIG. 4 is a flowchart illustrating a process for using asset modeling to generate UI for displaying live sensor data from an asset, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Without limiting method 400, method 400 is described with reference to elements in the figures.

At 410, a request from client device 120 to display real-time data for asset 104 may be received by CAMS 102. The request may be sent by client device 120 in response to a user selecting asset 104 from a list of assets displayed on an asset management system dashboard. The request may specify the specific asset for which to display real-time data as well as the screen dimensions of client device 120. The request may be handled by UI engine 118. UI engine 118 may make a request to DMS 110 for a data stream comprising the live values for all properties of the asset.

At 420, DMS 110 may handle the request from UI engine 118 and return a data stream comprising real-time sensor data from one or more sensors of asset 104. The data returned to UI engine 118 may be output data 116. The sensor data may be organized in such that values from sensors of the same type are grouped together. This may be done to enable UI engine to generate an easy-to-read UI for displaying the live data.

In order to provide UI engine 118 with real-time data in the desired format, DMS 110 may apply asset model 114 to the input data 112. DMS 110 may receive input data 112 from control panel 108 in a continuous data stream. Input data 112 may comprise data points collected from all assets managed by asset management system 100. As such input data 112 may include sensor data comprising a plurality of data points from sensors 106 associated with asset 104. Each sensor data point received by DMS 110 may have a data type corresponding to a type of sensor. A data type may include but is not limited to temperature, pressure, flow rate, humidity, etc. Additionally, each data point may be associated with a specific sensor which corresponds to the specific property of asset 104.

Input data 112 may also include values for properties of asset 104 that indicate the state of each asset managed by asset management system 100. These properties may be binary state values. An example of binary state property may be the state of a specific fan associated with a specific asset where the possible values may be "on" and "off" Binary state properties for asset 104 may be included in output data 116 and sent to UI engine 118.

At 430, asset model 114 describing the structure of the data and relationship between the data types is applied to input data 112. DMS 110 may retrieve asset model 114 and apply the model to input data 112 to produce output data 116. Applying asset model 114 to input data 112 may include, identifying the data points that correspond to properties of asset 104 as well as determining the property of asset 104 to which each data point belongs. In some embodiments, applying asset model 114 to input data 112 may also include categorizing the data points in input data 112 associated with asset 104 based on the data type of each data point. Applying asset model 114 may further include determining the relationships between the properties of asset 104 such and organizing the data based on these relationships.

At 440, DMS 110 may organize the data points by data type and property (i.e., the specific sensor from which the data point was collected) corresponding to the data point based on the application of asset model 114. For example, the data in output data 116 may be organized such that the data points corresponding to the one or more temperature properties of asset 104 may be in one group, while data points corresponding to the one or more humidity properties may be in a second group. The data may be organized in such a manner to enable display of the data in a table format.

In some embodiments, a user may want to view data for two or more assets within asset management system 100. Accordingly, DMS 110 may assign to one group data points from the two or more desired assets corresponding to properties of a particular data type. For example, data points collected by temperature sensors associated with the two or more desired assets may be organized in the same group.

At 450, UI engine 118 may generate a first UI for displaying the data points organized in the table format on client device 120. UI engine 118 may receive a response from DMS 110. The response from DMS 110 may be a data stream comprising output data 116. Output data 116 may comprise real-time values for the properties of asset 104. UI engine 118 may use output data 116 to generate a first UI for displaying the data points in a table format. The table may include a row for each data type and a value for each property of a type corresponding to the data type. For example, the table in the UI generated by UI engine 118 may include sections for temperature, humidity, pressure, flow speed, etc. Each section may include real-time values for multiple properties of a type corresponding to the section data type. In some embodiments, generating the first UI may include retrieving the display size of client device 120 from the initial request from the client device and generating the UI to fit the display size of client device 120.

At 460, UI engine 118 may send the generated UI to client device 120 and client device 120 may display the UI.

FIG. 5 is a flowchart illustrating a process for using asset modeling to generate UI for displaying historical trend data for a property of an asset, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Without limiting method 500, method 500 is described with reference to elements in the figures.

At 510, a request from client device 120 to display historical values for a first property of a specified asset for a specified time period may be received by CAMS 102. The request may specify the asset 104, property of the asset, and time period for which to display historical data. The request may also include the screen dimensions of client device 120. In response to receiving this request, UI engine 118 may make a request to DMS 110 for data comprising historical values for the specified property of asset 104 collected during the specified time period.

At 520, DMS 110 may handle the data request from UI engine 118 and return output data 116 comprising historical values for the specified first property of asset 104 collected during the specified time period. In some embodiments, DMS 110 may store input data 112 from control panel 108 comprising data points for all assets in asset management system 100 in a database. In some embodiments, asset model 114 may be applied to input data 112 before it is stored in the database. Each data point stored in the database may include a time indicating when the value was collected, the asset from which the value was collected, and the property to which the value belongs. The data may be stored in the database in such a manner to facilitate efficient retrieval of historical values for a given property of an asset.

In response to receiving a data request from UI engine 118, DMS 110 may make a database request specifying the asset, property of the asset, and time period for which values are needed. DMS 110 may receive a response from the database comprising data points for the specified first property of asset 104 collected during the specified time period. DMS 110 may then send a response to UI engine 118 comprising the historical values for the first property of asset 104 for the specified time period.

At 530, UI engine 118 may generate a second UI for displaying the historical values for the first property of asset 104 in a graph format. The graph generated to be displayed in the second UI may be a line graph where each line of the graph represents the trend of the values for a property of asset 104 collected over the specified time period. For example, the request from client device 120 may be a request to display temperature values collected by a specific thermometer of asset 104 over the last 24 hours. Accordingly, UI engine 118 may generate a graph comprising one line representing the trend of temperature values collected by the specified thermometer of asset 104 over the past 24-hour period. In some embodiments, if the generated graph has multiple trend lines, the lines may have different colors and UI engine 118 may include a legend in the user interface for identifying which trend lines correspond to which properties.

In some embodiments, the user may want to view historical values for a specific data type collected across multiple assets in asset management system 100. To generate a UI for displaying this data, UI engine 118 may retrieve the specified data from DSM 110. UI engine 118 may then generate a graph comprising a trend line for each property of the multiple assets with a value of the specified data type.

For example, the user may want to view ambient temperature readings over the last four hours for areas in the facility cooled by the multiple cooling units in asset management system 100. In response to this request, UI engine 118 may request data, from DMS 110, for temperature readings in the past four hours collected by every thermometer that measures room temperature and is associated with a cooling unit. UI engine 118 may then use the response data from DMS 110 to generate a UI with a graph including a trend line for each thermometer that measures room temperature and is associated with a cooling unit. In some embodiments, if multiple thermometers measuring room temperature are associated with one cooling unit, the trend lines representing the data from the thermometers associated with the cooling unit may be colored different shades of the same color.

Figure 6:
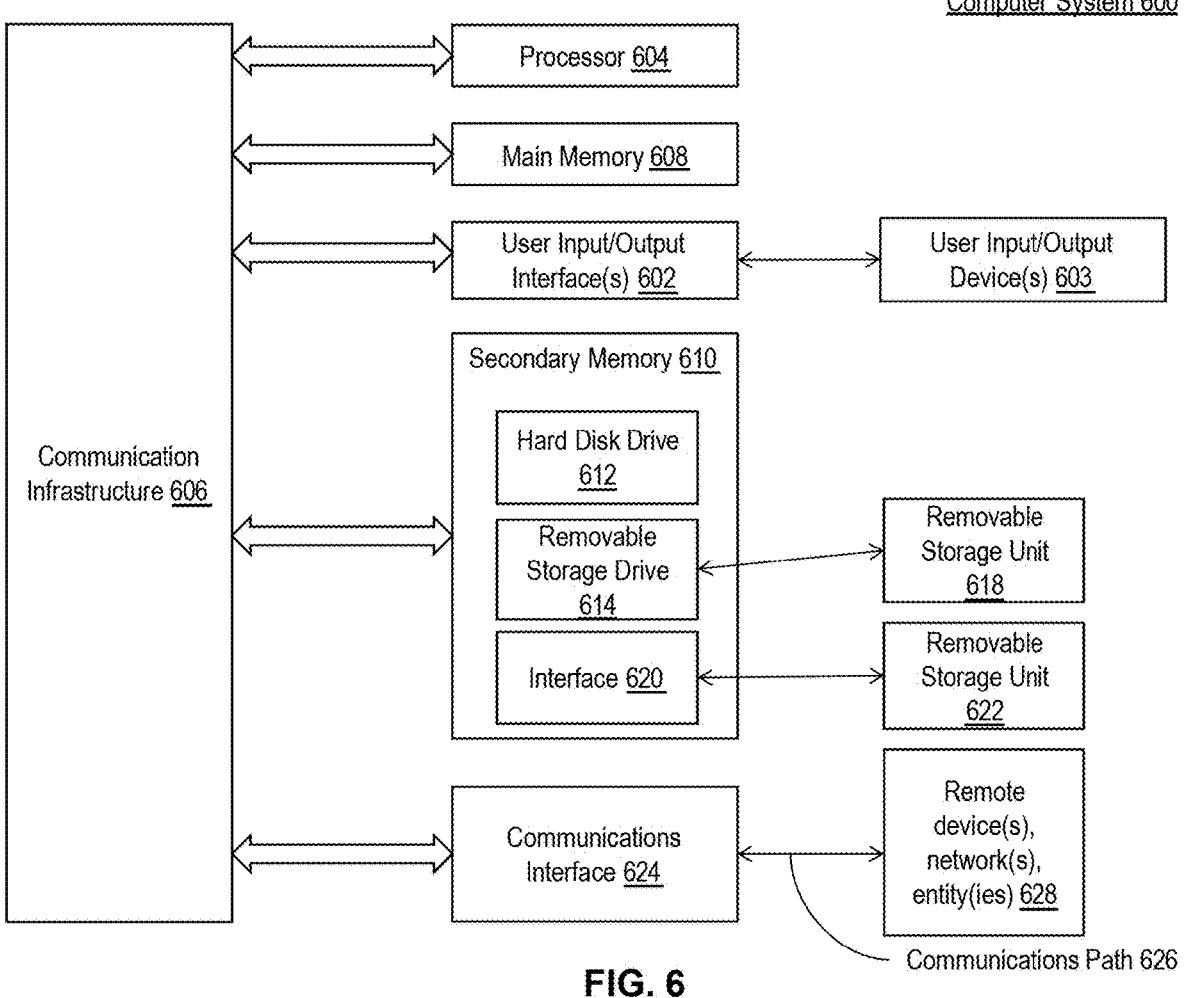
FIG. 6 illustrates an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   receiving a first request from a client device to display real-time data for a first asset;
   retrieving real-time sensor data from one or more sensors associated with the first asset, the real-time sensor data comprising a plurality of data points, wherein each data point of the plurality of data points comprises a data type corresponding to a type of sensor;

applying an asset model to the sensor data, wherein the applying the asset model comprises categorizing each data point of the plurality of data points based on the data type, wherein the asset model describes the first asset as a function of properties for which the one or more sensors of the first asset collect sensor data;

organizing the data points by the data type and a sensor of the one or more sensors corresponding to the data point based on the asset model for display in a table format;

generating a first user interface for displaying the data points organized in the table format, wherein the first user interface includes a row for each data type and a value for each sensor, of the one or more sensors of the sensor type corresponding to the data type, wherein the data type corresponds to a property of the first asset;

displaying the generated first user interface on the client device;

receiving a second request from the client device to display historical values for a first property of the first asset;

generating based on the second request, a second user interface displaying a trend graph of a subset of the sensor data for the first asset;

displaying the generated second user interface on the client device, wherein the second user interface replaces the first user interface on the client device;

receiving a third request from the client device to display assets related to the first asset;

retrieving, from the asset model, one or more assets related to the first asset and a relationship of each asset of the one or more related assets to the first asset;

generating a third user interface for displaying the one or more assets related to the first asset, wherein the third user interface includes a visual representation of the relationship of each asset of the one or more related assets to the first asset; and displaying the third user interface on the client device, wherein the third user interface replaces the second user interface on the client device.

2. The method of claim 1, wherein a value for the property indicates a function of the first asset.

3. The method of claim 1, wherein the asset model sensor data collected by the one or more sensors of the first asset includes relationships between the properties of the first asset.

4. The method of claim 1 further comprising:

receiving the second request from the client device to display the historical values for the first property of the first asset, wherein the second request includes a time period for which historical values are requested;

retrieving, from a database, historical data for the first property of the first asset for the time period; and generating the second user interface displaying the trend graph of the subset of the sensor data comprising data points of the first type collected over a period of time, wherein each line of the trend graph represents data points collected by a specific sensor over the period of time.

5. The method of claim 1, wherein the first and the second requests are generated by the client device responsive to a first interaction and a second interaction with an asset management dashboard displayed on the client device respectively.

6. The method of claim 5, wherein the first user interaction comprises selecting the first asset from a list of assets displayed on the asset management dashboard, and wherein the list of assets comprises all assets managed by an instance of a building management system.

7. The method of claim 5, wherein the second user interaction comprises selecting the first property of the first asset from a list of properties on the asset management dashboard, and wherein the list of properties comprises all properties associated with the first asset.

8. A system comprising:

a memory; and at least one processor coupled to the memory and configured to:

receive a first request from a client device to display real-time data for a first asset;

retrieve real-time sensor data from one or more sensors associated with the first asset, the real-time sensor data comprising a plurality of data points, wherein each data point of the plurality of data points comprises a data type corresponding to a type of sensor;

apply an asset model to the sensor data, wherein the applying the asset model comprises categorizing each data point of the plurality of data points based on the data type, wherein the asset model describes the first asset as a function of properties for which the one or more sensors of the first asset collect sensor data;

organize the data points by the data type and a sensor of the one or more sensors corresponding to the data point based on the asset model for display in a table format;

generate a first user interface for displaying the data points organized in the table format, wherein the first user interface includes a row for each data type and a value for each sensor, of the one or more sensors of the sensor type corresponding to the data type, wherein the data type corresponds to a property of the first asset;

display the generated first user interface on the client device;

receive a second request from the client device to display historical values for a first property of the first asset;

generate based on the second request, a second user interface displaying a trend graph of a subset of the sensor data for the first asset;

display the generated second user interface on the client device, wherein the second user interface replaces the first user interface on the client device;

receive a third request from the client device to display assets related to the first asset;

retrieve, from the asset model, one or more assets related to the first asset and a relationship of each asset of the one or more related assets to the first asset;

generate a third user interface for displaying the one or more assets related to the first asset, wherein the third user interface includes a visual representation of the relationship of each asset of the one or more related assets to the first asset; and display the third user interface on the client device, wherein the third user interface replaces the second user interface on the client device.

9. The system of claim 8, wherein a value for the property indicates a function of the first asset.

10. The system of claim 8, wherein the sensor data collected by the one or more sensors of the first asset includes relationships between the properties of the first asset.

11. The system of claim 8, wherein the at least one processor is further configured to:

receive second request from the client device to display the historical values for the first property of the first asset, wherein the second request includes a time period for which historical values are requested;

retrieve, from a database, historical data for the first property of the first asset for the time period; and generate the second user interface displaying the trend graph of the subset of the sensor data comprising data points of a first type collected over a period of time, wherein each line of the trend graph represents data points collected by a specific sensor over the period of time.

12. The system of claim 8, wherein the first request and the second request are generated by the client device responsive to a first interaction and a second interaction with an asset management dashboard displayed on the client device respectively.

13. The system of claim 12, wherein:

the first user interaction comprises selecting the first asset from a list of assets displayed on the asset management dashboard;

the second user interaction comprises selecting the first property of the first asset from a list of properties on the asset management dashboard;

the list of assets comprises all assets managed by an instance of a building management system; and the list of properties comprises all properties for the first asset.

14. A non-transitory computer-readable device having instructions stored thereon that, when executed by at least one computing device, cause the at least one computing device to perform operations comprising:

receiving a first request from a client device to display real-time data for a first asset;

retrieving real-time sensor data from one or more sensors associated with the first asset, the real-time sensor data comprising a plurality of data points, wherein each data point of the plurality of data points comprises a data type corresponding to a type of sensor;

applying an asset model to the sensor data, wherein the applying the asset model comprises categorizing each data point of the plurality of data points based on the data type, wherein the asset model describes the first asset as a function of properties for which the one or more sensors of the first asset collect sensor data;

organizing the data points by the data type and a sensor of the one or more sensors corresponding to the data point based on the asset model for display in a table format;

generating a first user interface for displaying the data points organized in the table format, wherein the first user interface includes a row for each data type and a value for each sensor, of the one or more sensors of the sensor type corresponding to the data type, wherein the data type corresponds to a property of the first asset;

displaying the generated first user interface on the client device;

receiving a second request from the client device to display historical values for a first property of the first asset;

generating based on the second request, a second user interface displaying a trend graph of a subset of the sensor data;

displaying the generated second user interface on the client device, wherein the second user interface replaces the first user interface on the client device;

receiving a third request from the client device to display assets related to the first asset;

retrieving, from the asset model, one or more assets related to the first asset and a relationship of each asset of the one or more related assets to the first asset;

generating a third user interface for displaying the one or more assets related to the first asset, wherein the third user interface includes a visual representation of the relationship of each asset of the one or more related assets to the first asset; and displaying the third user interface on the client device, wherein the third user interface replaces the second user interface on the client device.

15. The non-transitory computer-readable device of claim 14, wherein a value for the property indicates a function of the first asset.

16. The non-transitory computer-readable device of claim 14, wherein the sensor data collected by the one or more sensors of the first asset includes relationships between properties of the first asset.

17. The non-transitory computer-readable device of claim 14, the operations further comprising:

receiving the second request from the client device to display the historical values for the first property of the first asset, wherein the second request includes a time period for which historical values are requested;

retrieving, from a database, historical data for the first property of the first asset for the time period; and generating the second user interface displaying the trend graph of the subset of the sensor data comprising data points of a first type collected over a period of time, wherein each line of the trend graph represents data points collected by a specific sensor over the period of time.

18. The non-transitory computer-readable device of claim 14, wherein the first request and the second request are generated by the client device responsive to a first interaction and a second interaction with an asset management dashboard displayed on the client device respectively.

19. The non-transitory computer-readable device of claim 14, wherein the third request is generated by the client device in response to a third user interaction, the third user interaction comprising selecting a related assets tab of the asset management dashboard displayed on the client device.

* * * * *